United States Patent
Zander et al.

(10) Patent No.: US 10,155,487 B2
(45) Date of Patent: Dec. 18, 2018

(54) AIRBAG TETHERING CLIP ASSEMBLY

(71) Applicant: ILLINOIS TOOL WORKS INC., Glenview, IL (US)

(72) Inventors: Jason M. Zander, Hudson, WI (US); Jesse L. Jensen, Eau Claire, WI (US); Mark O. Lepper, Oak Park, IL (US); Michelle Bozinovski, Oakland Township, MI (US); Tim Hutson, Chippewa Falls, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/518,111

(22) PCT Filed: Aug. 3, 2015

(86) PCT No.: PCT/US2015/043354
§ 371 (c)(1),
(2) Date: Apr. 10, 2017

(87) PCT Pub. No.: WO2016/060728
PCT Pub. Date: Apr. 21, 2016

(65) Prior Publication Data
US 2017/0313263 A1 Nov. 2, 2017

Related U.S. Application Data

(60) Provisional application No. 62/064,641, filed on Oct. 16, 2014.

(51) Int. Cl.
*B60R 21/2338* (2011.01)
*B60R 13/02* (2006.01)
(Continued)

(52) U.S. Cl.
CPC ........ *B60R 13/0206* (2013.01); *B60R 21/213* (2013.01); *B60R 21/216* (2013.01);
(Continued)

(58) Field of Classification Search
CPC .............. B60R 13/0206; B60R 21/216; B60R 21/2163; Y10T 24/309
See application file for complete search history.

(56) References Cited

U.S. PATENT DOCUMENTS 6,394,695 B1  5/2002  Chausset
7,178,850 B2  2/2007  Smith et al.
(Continued)

FOREIGN PATENT DOCUMENTS

FR    2780115 A1    12/1999
WO    2013032561 A1    3/2013

OTHER PUBLICATIONS

ISR & WO for PCT/US2015/043354 dated Feb. 3, 2016.
Communication regarding EP 15757036.7-1132, dated May 18, 2018.

*Primary Examiner* — Robert Sandy
*Assistant Examiner* — Michael S Lee
(74) *Attorney, Agent, or Firm* — Joseph M. Butscher; The Small Patent Law Group, LLC

(57) ABSTRACT

A tethering clip assembly is configured to tether first and second components of a vehicle together before and during deployment of an airbag. The tethering clip assembly may include a securing base configured to secure to the first component, a retainer configured to secure to the second component, and one or more tethers that couple the securing base to the retainer. The securing base, the retainer, and the tether(s) are integrally formed together.

16 Claims, 4 Drawing Sheets

(51) Int. Cl.
*B60R 21/216* (2011.01)
*F16B 21/06* (2006.01)
*B60R 21/213* (2011.01)
*B60R 21/232* (2011.01)

(52) U.S. Cl.
CPC .......... *F16B 21/06* (2013.01); *B60R 13/0212* (2013.01); *B60R 21/232* (2013.01); *B60R 2021/2161* (2013.01)

(56) References Cited

U.S. PATENT DOCUMENTS

| | | | |
|---|---|---|---|
| 8,218,145 B2 | 7/2012 | Moriya et al. | |
| 8,316,514 B2 | 11/2012 | Sano | |
| 8,844,992 B1* | 9/2014 | Noga | B60R 13/0206 24/289 |
| 2006/0032029 A1* | 2/2006 | Nessel | B60R 13/0206 24/289 |
| 2006/0290155 A1 | 12/2006 | Smith | |
| 2007/0220716 A1 | 9/2007 | Hansen | |
| 2008/0235919 A1* | 10/2008 | Giddings | B60R 13/0206 24/289 |
| 2010/0199464 A1* | 8/2010 | Sano | B60R 13/02 24/289 |
| 2012/0153536 A1 | 6/2012 | Coffield et al. | |
| 2013/0312230 A1 | 11/2013 | Chang et al. | |
| 2014/0225355 A1* | 8/2014 | Risdale | B60R 21/216 280/743.2 |
| 2016/0069366 A1* | 3/2016 | Benedetti | F16B 5/065 24/297 |

* cited by examiner

AIRBAG TETHERING CLIP ASSEMBLY

RELATED APPLICATIONS

This application is a national phase of International Application Number PCT/US2015/043354 filed Aug. 3, 2015 and claims priority from U.S. Provisional Patent Application No. 62/064,641 filed Oct. 16, 2014, which is hereby incorporated by reference in its entirety.

FIELD OF EMBODIMENTS OF THE DISCLOSURE

Embodiments of the present disclosure generally relate to airbags configured for use with automobiles, and, more particularly, to airbag tethering clip assemblies configured to vehicle components together during deployment of an airbag.

BACKGROUND

Automotive side curtain airbags (SCABs) are a standard safety feature for an increasing number of automobiles every year. Typically, after an airbag is manufactured, the airbag is rolled up, and then sealed in a sleeve that keeps the airbag properly oriented and positioned until a deployment event.

A variety of sleeve designs are used by major airbag manufacturers. An airbag sleeve is typically formed of plastic or fabric. Velcro, adhesives, or heat-welding are used to close the sleeve around an airbag. When an airbag is deployed, the sleeve tears in order to allow the airbag to inflate and expand.

Conventional airbags may also be rolled up and inserted into a fabric sock. Fabric tabs extend from the rolled bag at various points. Metal stamped parts are then folded over the fabric tabs. The metal stamped parts may then be bolted onto sheet metal, such as that of an automobile frame.

During airbag deployment, structures within the vehicle other than the airbag may eject into the vehicle cabin. For example, a covering panel may be ejected into the cabin as the airbag deploys. In such circumstances, the projectiles may cause injury to a driver or passenger.

U.S. Pat. No. 8,316,514, entitled "Trim Clip for Trim for Curtain Side Air Bag," discloses a trim clip suitable for holding a curtain side air bag trim for covering and accommodating an air bag. U.S. Pat. No. 8,218,145 and U.S. Pat. No. 7,178,850, both entitled "Tethered Fastener Apparatus and Method," disclose devices for fastening objects, such as a tethered fastener device for insertion into an engagement structure, such as a vehicle chassis, a hollow substrate, a wall, a plate, or any suitable surface.

Tethering clips are used to tether an components of within a vehicle together. Typically, a tethering clip is formed of metal and plastic. However, the use of metal and plastic in known tethering clips adds weight to both the tethering clips and to vehicles in which the tethering clips are secured. Also, the metal and plastic clips often rattle or produce other such noise during operation of a vehicle. Further, a metal tethering clip is not easy to remove from a structure, such as sheet metal. Instead, in order to remove the metal tethering clip, an individual typically uses multiple tools, which may damage the structure. Additionally, many known tethering clips are large, stiff, and prone to fracturing during airbag deployment.

Accordingly, a need exists for an improved tethering clip that may be used to secure an airbag within a vehicle structure.

SUMMARY OF EMBODIMENTS OF THE DISCLOSURE

Certain embodiments of the present disclosure provide a tethering clip assembly configured to tether first and second components of a vehicle together before and during deployment of an airbag. The tethering clip assembly may include a securing base configured to secure to the first component, a retainer configured to secure to the second component, and one or more tethers that couple the securing base to the retainer. The securing base, the retainer, and the tether(s) may be integrally formed together as a single piece. Each of the securing base, the retainer, and the tether(s) may be formed of plastic. The tethering clip assembly may be devoid of metal. In at least one embodiment, the tethering clip assembly includes a pair of parallel tethers.

The retainer may include opposed end blocks, a base beam extending between portions of the opposed end blocks, and a plurality of first legs extending from the base beam.

In at least one embodiment, the tethering clip assembly may include a securing pin. The securing pin may be retained within the retainer. The securing pin securely couples the retainer to the securing base in a non-deployed state, and is configured to detach from a portion of the securing base in response to the deployment of the airbag. The retainer may also include a frame defining a passage. The tether(s) may connect to the frame. The first legs may extend from the base toward and outwardly in relation to the frame. A pin chamber may be defined between the frame, the opposed end blocks, the base beam, and the first legs. The securing pin may be secured within the pin chamber.

In at least one embodiment, the securing pin may include a planar main body and second legs extending from the main body. Each of the second legs may include an extension beam that connects to a distal clip that is configured to securely hook onto the base beam to secure the securing pin to the retainer. The securing pin may also include a securing stud extending from the main body opposite from the second legs. The securing stud is configured to removably secure to a hole formed through a portion of the securing base. The securing stud is secured within the hole in the non-deployed state, and is configured to detach from the hole in response to the deployment of the airbag.

In at least one embodiment, at least one of the first legs may include a notch configured to securely retain an edge portion of the second component, and a tab proximate to the notch. The tab is configured to be engaged by a tool to remove the retainer from the second component.

The tether(s) may be formed by being stretched between the securing base and the retainer. The tether(s) may be folded with an arcuate bend in a non-deployed state, and straighten in response to the securing base separating from the retainer.

In at least one embodiment, the tethering clip assembly may not include a separate and distinct securing pin. Instead, the securing base or the retainer may include one or more protuberances, while the other of the securing base or the retainer may include one or more windows (for example, reciprocal openings) configured to retain the protuberance(s). The securing base is secured to the retainer in a non-deployed state by the window(s) retaining the protuberance(s). The protuberance(s) separate from the window(s) in response to the deployment of the airbag.

Certain embodiments of the present disclosure provide an airbag system. The airbag system may include a first component (such as a trim panel) within a vehicle, a second component (such as sheet metal of a portion of a frame or base) within a vehicle, and an airbag secured between the first and second components and deflated in a non-deployed state, and a tethering clip assembly that tethers the first and second components together before and during deployment of an airbag. The tethering clip assembly may include a securing base secured to the first component, a retainer secured to the second component, and one or more tethers that couple the securing base to the retainer. The securing base, the retainer, and the tether(s) may be integrally formed together as a single piece of plastic, for example, and the tethering clip assembly may be devoid of metal.

Figure 1:
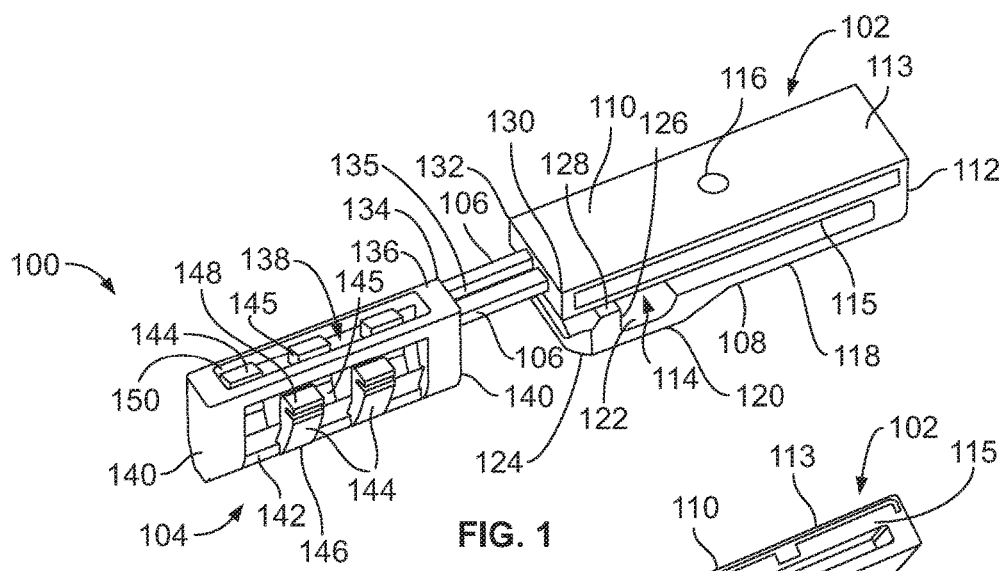
FIG. 1 illustrates a perspective top view of an initially-formed tethering housing, according to an embodiment of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a tethering clip assembly that may be formed, at least in part, through stretching methods, such as shown and described with respect to United States Patent Application Publication No. 2012/0153536, entitled "Pre-Deformed Thermoplastics Spring and Method of Manufacture," and United States Patent Application Publication No. 2013/0312230, entitled "One-Piece Zipper Puller," both of which are hereby incorporated by reference in their entireties.

Embodiments of the present disclosure provide tethering clip assemblies that, in comparison to known tethering clips, are compact and flexible. The tethering clip assemblies of the present disclosure may be formed entirely of plastic, without any metal. That is, the tethering clip assemblies may be devoid of metal. The all-plastic assemblies are lighter, less expensive, and less prone to generating noise, as compared to known tethering clips.

Embodiments of the present disclosure provide tethering clip assemblies that may be used to securely retain a trim pillar during airbag deployment, for example. The tethering clip assemblies may be used in A, B, and C pillars of a vehicle, for example.

FIG. 1 illustrates a perspective top view of an initially-formed tethering housing 100, according to an embodiment of the present disclosure. The tethering housing 100 may be integrally molded and formed as a single piece of plastic. The tethering housing 100 may be formed as a single piece of thermoplastic elastomer, such as Hytrel®. The tethering housing 100 may include a securing base 102 that connects to a retainer 104 through one or more tethers 106. The tethering housing 100 is configured to retain a securing pin, which may have legs that snapably secure to a beam of the retainer 104. Together, the tethering housing 100 and the securing pin form a tethering clip assembly.

The securing base 102 is configured to secure to a first component or structure (such as a trim panel), while the retainer 104 is configured to secure to a second component or structure (such as piece of sheet metal). For example, the securing base 102 may include a portion that latches, hooks, or otherwise secures onto a counterpart portion of the first component. The retainer 104 may include one or more legs having notches that retain an edge portion of the second component.

The securing base 102 may include a first panel 108 connected to a second panel 110 through a connecting beam 112. The connecting beam 112 may be perpendicular to the first and second panels 108 and 110. As such, the connecting beam 112 may provide a right angle connection between the first and second panels 108 and 110. Alternatively, the connecting beam 112 may couple the first and second panels 108 and 110 together at various other angles. In at least one other embodiment, the connecting beam 112 may be an arcuate beam, instead of a linear beam.

The connecting beam 112 separates the first and second panels 108 and 110 apart from one another. Accordingly, a gap 114 exists between the first and second panels 108 and 110.

The first panel 108 may be a lower panel (as oriented in FIG. 1) and may include an extension strap 118 extending outwardly from a lower end of the connecting beam 112. The extension strap 118 may be parallel to the second panel 110. The extension strap 118 may connect a recessed strap 120 that provides a divot 122 that extends from opposite sides of the recessed strap 120. As shown, the recessed strap 120 may downwardly extend from the extension strap 118.

The recessed strap 120 may connect to a distal end 124 having a blunt edge 126 proximate to the divot 122, an upper linear ledge 128 that outwardly extends from the blunt edge 126, and a beveled tip 130.

The second panel 110 may be an upper panel (as oriented in FIG. 1) and may include opposed planar straps (such as planar surfaces) 113 and 115 that are spaced apart from one another. A portion of a structural component may be configured to be securely retained within the space between the straps 113 and 115. A hole 116 may be formed through the planar strap 113.

The tethering housing 100 may include two parallel tethers 106. Alternatively, the tethering housing 100 may include a single tether, or more tethers than shown. The tethers 106 outwardly extend from an end wall 132 of the panel 110. The end wall 132 may be perpendicular to the straps 113 and 115. The end wall 132 connects distal ends of the straps 113 and 115 together.

Each tether 106 may include a beam that outwardly extends form the securing base 102 and connects to a proximal end 134 of the retainer 104. The tethers 106 may be separated by a longitudinal space 135. Alternatively, a single planar tether having no internal space may be used.

The retainer 104 may include a frame 136 defining a passage 138 therethrough. The tethers 106 may connect to the frame 136 at the proximal end 134. Opposed end blocks 140 extend downwardly from opposite ends of the frame 136. A base beam 142 extends between lower ends of the opposed end blocks 140.

Legs 144 extend upwardly from the base beam 142. Each leg 144 may include an outwardly canted root 146 that connects to a free end 148. As shown, the free end 148 may angle away from the frame 136. The legs 144 on each side of retainer 104 are separated from one another by a gap 145. As shown, one side of the retainer 104 may include two legs 144, while the opposite side may include three legs 144. The legs 144 on opposite sides may not directly oppose one another. Instead, each leg 144 on one side of the retainer 104 may be aligned with a space on the opposite side of the retainer 104. In this manner, the legs 144 may be arranged in alternating fashion on opposite sides of the retainer 104.

A pin chamber 150 may be defined within the retainer 104 between the end blocks 140, the base beam 142, the legs 144, and internal surfaces of the frame 136. The pin chamber 150 is configured to retain a securing pin therein.

Figure 2:
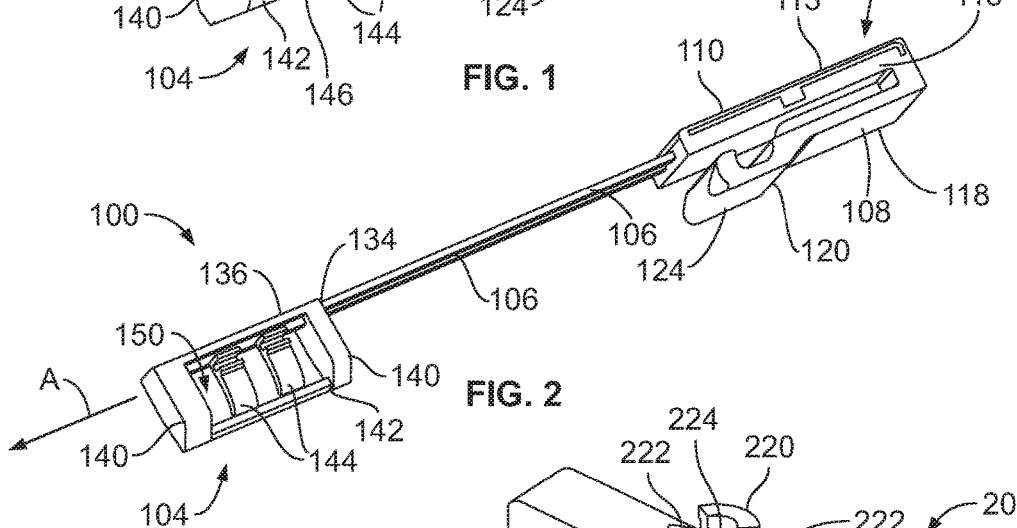
FIG. 2 illustrates a perspective lateral view of a tethering housing after an intermediate forming operation, according to an embodiment of the present disclosure.

FIG. 2 illustrates a perspective lateral view of the tethering housing 100 after an intermediate forming operation, according to an embodiment of the present disclosure. After the tethering housing 100 is initially formed, as shown in FIG. 1, the retainer 104 is pulled away from the securing base 102 in the direction of arrow A, thereby outwardly stretching the tethers 106 away from the securing base 102, as shown. For example, a forming machine or robot may be used to pull the retainer 104 away from the securing base 102, as shown. Therefore, the tethers 106 may be formed by being stretched between the securing base 102 and the retainer 104. By stretching the tethers 106 to a desired length, the flexibility of the tethers 106 is increased, while the strength and robustness of the tethers 106 is maintained. The stretched tethers 106 are also resilient and configured to effectively absorb energy from a deploying airbag.

Figure 3:
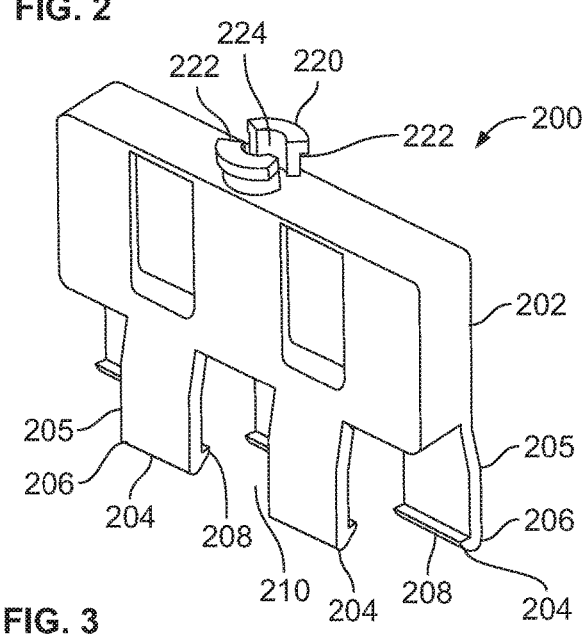
FIG. 3 illustrates a perspective top view of a securing pin, according to an embodiment of the present disclosure.

FIG. 3 illustrates a perspective top view of a securing pin 200, according to an embodiment of the present disclosure. The securing pin 200 may also be formed as a separate and distinct piece of thermoplastic elastomer. The securing pin 200 is configured to be retained within the pin chamber 150 of the retainer 104 (shown in FIGS. 1 and 2). In particular, the securing pin 200 is configured to be positioned within the pin chamber 150 and fill space therein.

The securing pin 200 may include a planar main body 202 having legs 204 extending downwardly therefrom. Each leg 204 may include an extension beam 205 that connects to a distal clip 206, which may include an inwardly-directed ledge 208 that is perpendicular to the extension beam 205. As shown, the legs 204 on one side are separated by a space 210. The legs 204 on opposite sides may be alternately arranged, such that a leg 204 on one side is directly aligned with a space 210 on an opposite side.

A securing stud 220 may extend from an upper edge of the main body 202 opposite from the legs 204. The securing stud 220 may include opposed resilient protuberances 222 (such as posts, snaps, or the like) separated by a gap 224. The securing stud 220 may be or include one or more snap features (for example, the opposed protuberances 222), that are configured to secure to a complementary feature, such as the hole 116 formed in the base 102

Figure 4:
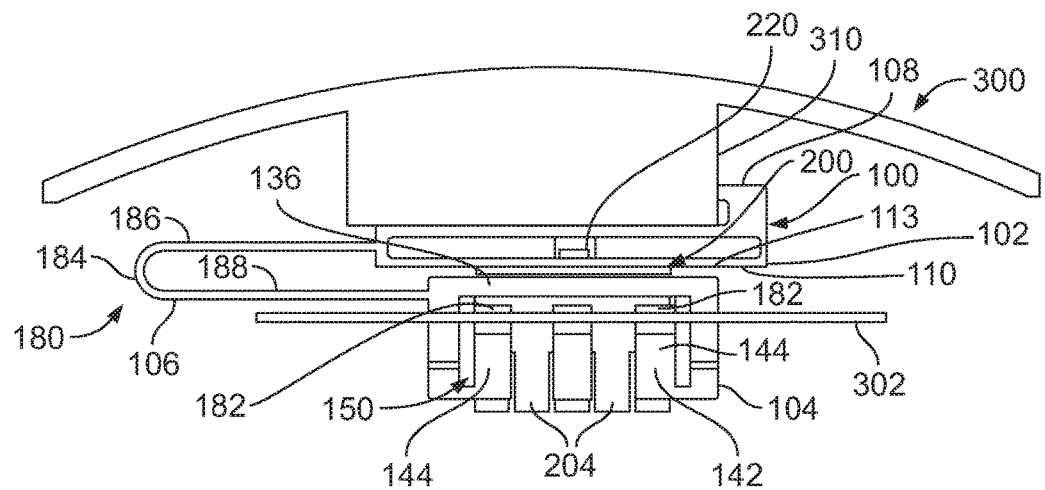
FIG. 4 illustrates a lateral view of a tethering clip assembly secured to a first structure and a second structure, according to an embodiment of the present disclosure.

FIG. 4 illustrates a lateral view of a tethering clip assembly 180 secured to a first structure 300 and a second structure 302, according to an embodiment of the present disclosure. It is to be understood that the first structure 300 may optionally be a second structure, and the second structure 302 may optionally be a first structure. The terms first and second are not limiting to what is shown in the Figures. The first structure 300 may be a trim panel of a vehicle, while the second structure 302 may be a sheet metal frame or other such structure within the vehicle.

The tethering clip assembly 180 includes the tethering housing 100 and the securing pin 200. As shown, the securing pin 200 is secured within the pin chamber 150 of the retainer 104.

The securing pin 200 is secured within the pin chamber 150 such that the legs 204 of the securing pin 200 are positioned within spaces between legs 144 of the retainer 104. The distal clips 206 of the securing pin 200 hook underneath and secure to the base beam 142 of the retainer 104, thereby securing the securing pin 200 within the pin chamber 150. Further, the free ends 148 of the legs 144 of the retainer 104 may include notches 182 that receive and retain edge portions of the second structure 302, thereby securing the tethering clip assembly 180 to the second structure 302.

The tethers 106 are folded over so that an arcuate bend 184 is formed. As such, first segments 186 of the tethers 106 are positioned over at least portions of second segments 188 of the tethers 106. In this manner, the securing base 102 is positioned over or otherwise vertically aligned with the retainer 104.

The securing stud 220 of the securing pin 200 is retained within the hole 116 (shown in FIG. 1) formed through the strap 113 of the panel 110. Therefore, in a non-deployed state, the securing base 102 is securely connected to the retainer 104 by way of the securing pin 200.

The first structure 300 may include one or more connection members 310, such as opposed clips, tabs, straps, panels, or the like, that are secured between the panels 108 and 110 of the securing base 102. For example, the distal end 124 (shown in FIGS. 1 and 2) may clasp, clamp, hook, or otherwise secure onto a portion of the connection members 310, such as through a resilient snap fit, latch fit, or the like. Accordingly, the tethering clip assembly 180 is secured to the first structure 300 by way of the securing base 102, and to the second structure 302 by way of the notches 182 securely retaining edge portions of the second structure 302.

As shown, the tethering clip assembly 180 is in the non-deployed or connected state. The non-deployed state may be a compressed state in that the securing base 102 and the retainer 104 are compressed towards one another and connected together by way of the securing stud 220 being retained within the hole 116. In the non-deployed, connected state, the tethers 106 are folded over as shown, and the retainer 104 is proximate to the securing base 102. Accordingly, the second structure 302 is proximate to the connecting member(s) 310.

When the securing pin 200 is urged into the pin chamber 150 of the retainer 104, the legs 204 of the securing pin 200 may be unable to flex, thereby increasing the retention force of the tethering clip assembly 180. For example, the frame 136 of the retainer 104 may inwardly compress the legs 204 and limit outward spreading of the legs 204. The legs 204 remain in a compressed state, thereby ensuring that the legs 204 remain securely hooked onto the base beam 142 of the retainer 104. The legs 204 are retained by the retainer 104 during airbag deployment. The legs 204 are configured to be released when pulled on by an operator to allow the legs 204 to flex for removal.

The securing stud 220 is configured to release from the hole 116 upon exertion of a predetermined force. For example, the securing stud 220 and the hole 116 may be designed and tuned so that the securing stud 220 releases from the hole 116 upon exertion of a particular force, such as may be exerted during a vehicle impact.

Figure 5:
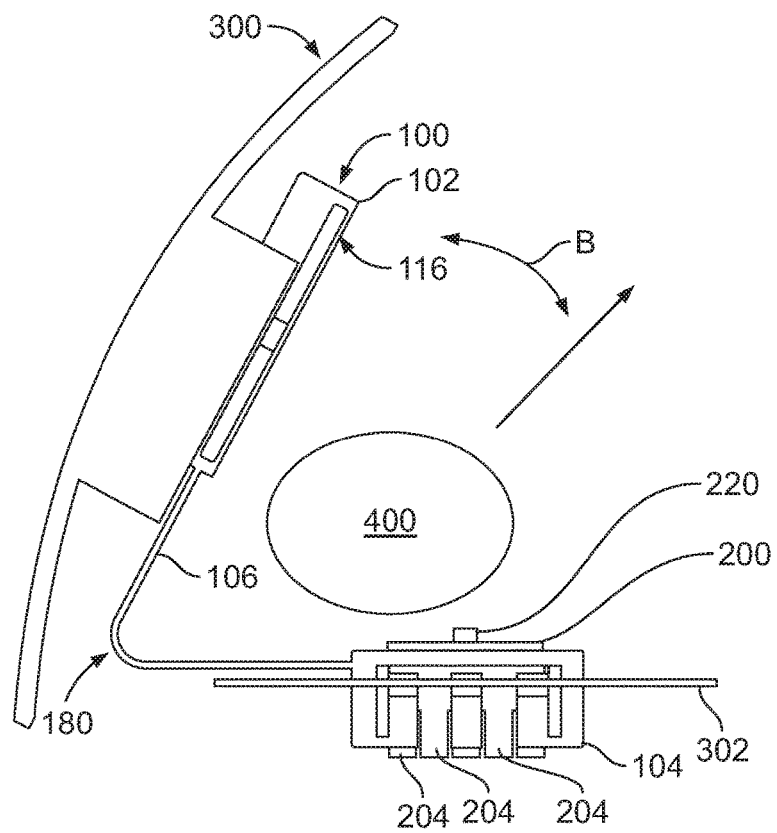
FIG. 5 illustrates a lateral view of a tethering clip assembly during deployment of an airbag, according to an embodiment of the present disclosure.

FIG. 5 illustrates a lateral view of the tethering clip assembly 180 during deployment of an airbag 400, according to an embodiment of the present disclosure. FIG. 5 illustrates an airbag system that includes the tethering clip assembly tethering the first structure 300 to the second structure 302 with the airbag 400 secured between the first and second structures 300 and 302. As shown in FIGS. 4 and 5, the securing base 102 of the housing 100 is secured to a portion of the first structure 300. During deployment, the airbag 400 inflates, which forces the securing base 102 to separate from the securing pin 200, by way of the securing stud 220 releasing from the hole 116. As the first structure 300 moves relative to the second structure 302, the tethers 106 allow a controlled amount of movement, but ensure that the first structure 300 remains secured to the second structure 302. For example, the tethers 106 unfold about the arcuate bend 184 in the direction of arc B and tend to straighten. In this manner, the tethering clip assembly 180 ensures that the first structure 300, such as a trim panel, does eject an unsafe distance into a cabin of a vehicle (that is, the tethering clip assembly 180 prevents the first structure 300 from becoming a projectile), and, at the same time, provides enough space for the airbag 400 to inflate.

Figure 6:
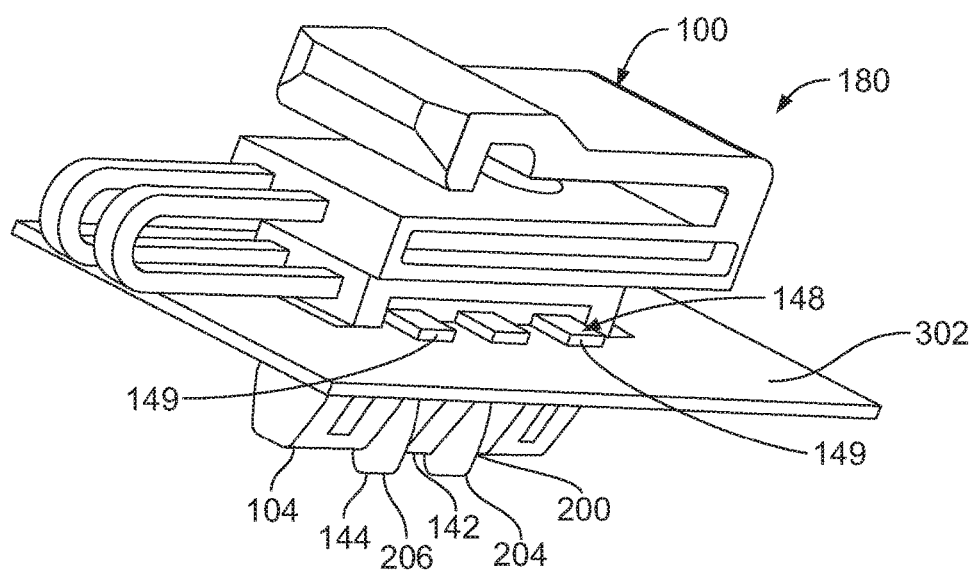
FIG. 6 illustrates a perspective front lateral view of a tethering clip assembly secured to a structure, according to an embodiment of the present disclosure.

FIG. 6 illustrates a perspective front lateral view of the tethering clip assembly 180 secured to the second structure 302 (such as sheet metal), according to an embodiment of the present disclosure. As shown, the legs 144 of the retainer 104 cooperate with the legs 204 of the securing pin 200 to ensure that the securing pin 200 secures to the retainer 104. As noted above, the distal clips 206 of the securing pin 200 securely hook underneath the base beam 142 of the retainer 104. The free ends 148 of each of the legs 144 may include outwardly extending terminal tabs 149 that overlay a portion of the second structure 302. The terminal tabs 149 may be separated from opposed features by the notches 182, into which an internal edge of the second structure 302 is secured. The tabs 149 are configured to be engaged by a tool that may squeeze or otherwise compress them inwardly towards a center plane of the retainer 104, thereby allowing the tethering clip assembly 180 to be quickly and easily removed from a retaining opening formed in the second structure 302.

Figure 7:
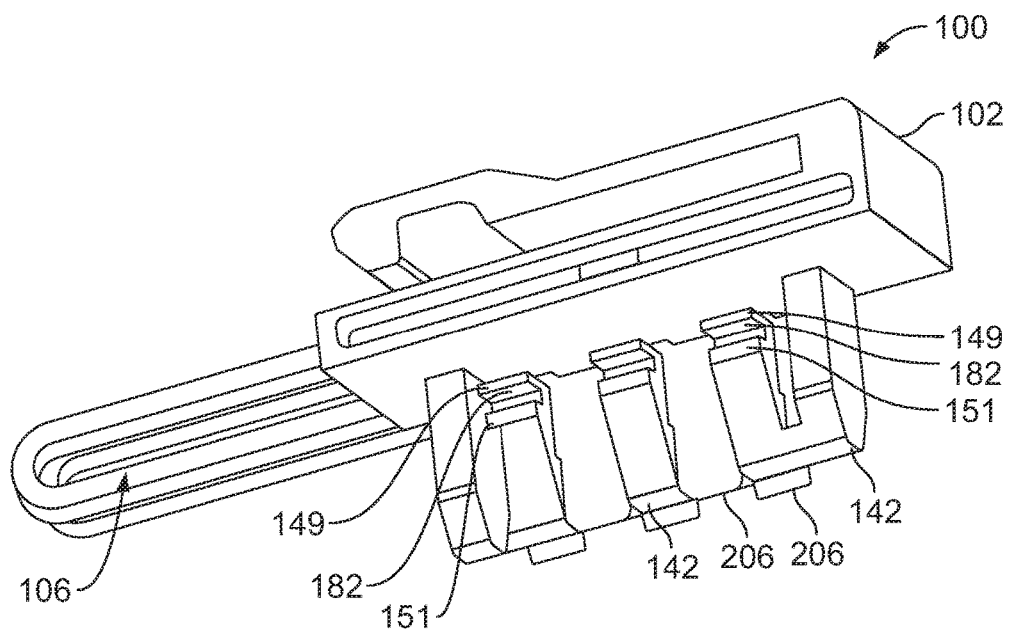
FIG. 7 illustrates a perspective bottom view of a tethering clip assembly, according to an embodiment of the present disclosure.

FIG. 7 illustrates a perspective bottom view of the tethering clip assembly 180, according to an embodiment of the present disclosure. As shown, the notches 182 are defined between lower surfaces of the tabs 149 and upper surfaces of opposed ledges 151 of the legs 204. Internal edge portions of the second structure 302 (such as piece of sheet of metal) are retained within the notches 182. As also shown in FIG. 7, the distal clips 206 of the legs 204 hook onto lower surfaces of the base beam 142 of the retainer 104.

The securing base 102 may include various other interfaces that are configured to secure to a first structure, other than shown. For example, instead of the opposed planes, the securing base 102 may include securing tabs, pins, latches, clasps, clamps, or the like that are configured to secure onto a portion of the first structure.

Figure 8:
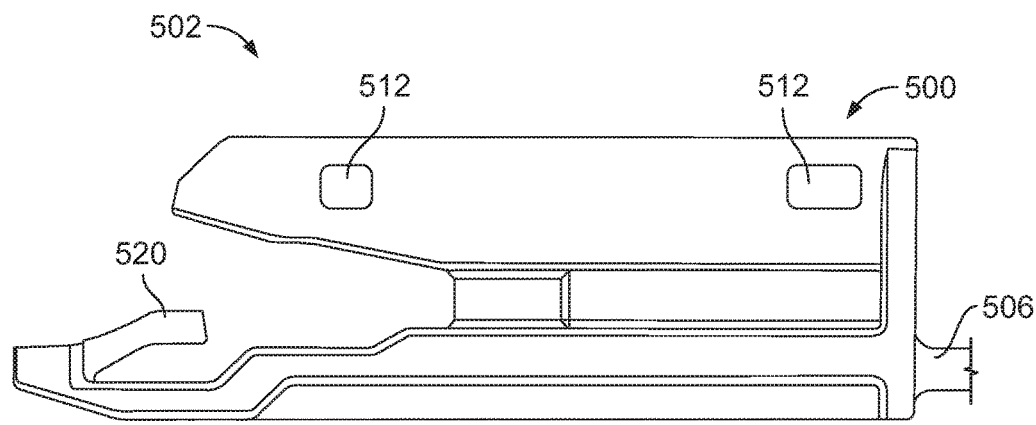
FIG. 8 illustrates a lateral view of a securing base of a tethering clip assembly, according to an embodiment of the present disclosure.
Figure 9:
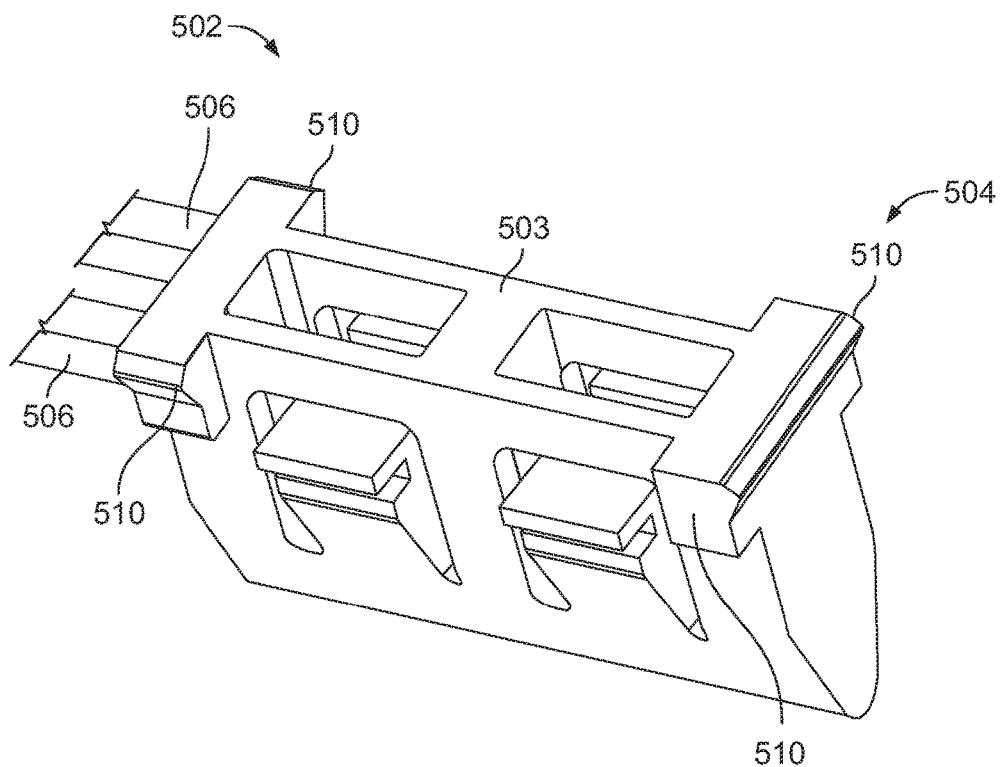
FIG. 9 illustrates a perspective top view of a retainer, according to an embodiment of the present disclosure.

FIG. 8 illustrates a lateral view of a securing base 500 of a tethering clip assembly 502, according to an embodiment of the present disclosure. FIG. 9 illustrates a perspective top view of a retainer 504 of the tethering clip assembly 502, according to an embodiment of the present disclosure. Referring to FIGS. 8 and 9, the tethering clip assembly 502 includes tethers 506 that connect the securing base 500 to the retainer 504, as described above. In contrast to the tethering clip assembly 180, however, the tethering clip assembly 502 is an integrally molded and formed single piece. The tethering clip assembly 180 does not include a separate and distinct securing pin, thereby providing a simple, cost effective design.

When the tethers 506 are folded over into a non-deployed state, outwardly extending protuberances 510 (such as bumps, blocks, ramps, snaps, or other such detents) of the retainer 504 are received and retained within reciprocal windows 512 formed in the securing base 500, thereby securing the retainer 504 to the securing base 502. Upon exertion of sufficient force (such as force that deploys an airbag), the protuberances 510 are forced out of the windows 512, which allows the tethers 506 to extend, as described above. Alternatively, the securing base 502 may include the protuberances, while the retainer 504 includes the windows.

Additionally, the securing base 502 may include a hook 520 that is configured to hook onto a first structure. As such, the securing base 502 may provide a simpler design that does not include straps separated by a gap (into which a portion of the first structure is secured). Instead, the hook 520 hooks onto a portion of the first structure.

Also, as shown in FIG. 9, a central rib 530 may connect opposite sides of the retainer 504 together. The central rib 530 provides rigidity and strength to the retainer 504. Optionally, more ribs than shown may be used. Alternatively, the central rib 530 may not be used. In at least one other embodiment, an entire space between the sides of the retainer may be occupied by structure. For example, the retainer 504 may be formed without an internal space, and may instead be simply a solid block of material.

Referring to FIGS. 1-9, embodiments of the present disclosure provide tethering clip assemblies that may be wholly formed of plastic. As such, compared to previous tethering clips, embodiments of the present disclosure are lighter, more flexible, and more resilient. Additionally, embodiments of the present disclosure are not susceptible to rattling or generating other such noise (such as by metal parts rattling together in previous tethering clips). Also, unlike metal clips, embodiments of the present disclosure are easy to remove from a structure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A tethering clip assembly configured to tether first and second components of a vehicle together before and during deployment of an airbag, the tethering clip assembly comprising:
   a securing base configured to secure to the first component;
   a retainer configured to secure to the second component, wherein the retainer comprises:
   opposed end blocks, a base beam extending between portions of the opposed end blocks, and a plurality of first legs extending from the base beam;
   one or more tethers that couple the securing base to the retainer; and
   a securing pin, wherein the securing pin is retained within the retainer, wherein the securing pin securely couples the retainer to the securing base in a non-deployed state, and wherein the securing pin is configured to detach from a portion of the securing base in response to the deployment of the airbag,
   wherein the securing base, the retainer, and the one or more tethers are integrally formed together.

2. The tethering clip assembly of claim 1, wherein each of the securing base, the retainer, and the one or more tethers is formed of plastic.

3. The tethering clip assembly of claim 1, wherein the tethering clip assembly is devoid of metal.

4. The tethering clip assembly of claim 1, wherein the one or more tethers comprises a pair of parallel tethers.

5. The tethering clip assembly of claim 1, wherein the retainer further comprises a frame defining a passage, wherein the one or more tethers connect to the frame, wherein the plurality of first legs extend from the base toward and outwardly in relation to the frame, wherein a pin chamber is defined between the frame, the opposed end blocks, the base beam, and the plurality of first legs, and wherein the securing pin is secured within the pin chamber.

6. The tethering clip assembly of claim 5, wherein the securing pin comprises:
   a planar main body;
   a plurality of second legs extending from the main body, wherein each of the plurality of second legs comprises an extension beam that connects to a distal clip that is configured to securely hook onto the base beam to secure the securing pin to the retainer; and
   a securing stud extending from the main body opposite from the second legs, wherein the securing stud is configured to removably secure to a hole formed through a portion of the securing base, wherein the securing stud is secured within the hole in the non-deployed state, and wherein the securing stud is configured to detach from the hole in response to the deployment of the airbag.

7. The tethering clip assembly of claim 1, wherein at least one of the plurality of first legs comprises:
   a notch configured to securely retain an edge portion of the second component; and
   a tab proximate to the notch, wherein the tab is configured to be engaged by a tool to remove the retainer from the second component.

8. The tethering clip assembly of claim 1, wherein the one or more tethers are formed by being stretched between the securing base and the retainer.

9. The tethering clip assembly of claim 1, wherein the one or more tethers are folded with an arcuate bend in a non-deployed state, and wherein the one or more tethers straighten in response to the securing base separating from the retainer.

10. An airbag system, comprising:
    a first component within a vehicle;
    a second component within a vehicle;
    an airbag secured between the first and second components and deflated in a non-deployed state; and
    a tethering clip assembly that tethers the first and second components together before and during deployment of an airbag, the tethering clip assembly comprising:
    a securing base secured to the first component;
    a retainer secured to the second component, wherein the retainer comprises opposed end blocks, a base beam extending between portions of the opposed end blocks, and a plurality of first legs extending from the base beam;
    one or more tethers that couple the securing base to the retainer, wherein the securing base, the retainer, and the one or more tethers are integrally formed together as a single piece of plastic, and wherein the tethering clip assembly is devoid of metal; and
    a securing pin, wherein the securing pin is retained within the retainer, wherein the securing pin securely couples the retainer to the securing base in a non-deployed state, wherein the securing pin is configured to detach from a portion of the securing base in response to the deployment of the airbag, wherein the retainer further comprises a frame defining a passage, wherein the one or more tethers connect to the frame, wherein the plurality of first legs extend from the base toward and outwardly in relation to the frame, wherein a pin chamber is defined between the frame, the opposed end blocks, the base beam, and the plurality of first legs, and wherein the securing pin is secured within the pin chamber.

11. The airbag system of claim 10, wherein the securing pin comprises:
    a planar main body;
    a plurality of second legs extending from the main body, wherein each of the plurality of second legs comprises an extension beam that connects to a distal clip that is configured to securely hook onto the base beam to secure the securing pin to the retainer; and
    a securing stud extending from the main body opposite from the second legs, wherein the securing stud is configured to removably secure to a hole formed through a portion of the securing base, wherein the securing stud is secured within the hole in the non-deployed state, and wherein the securing stud is configured to detach from the hole in response to the deployment of the airbag.

12. The airbag system of claim 10, wherein at least one of the plurality of first legs comprises:
 a notch that securely retains an edge portion of the second component; and
 a tab proximate to the notch, wherein the tab is configured to be engaged by a tool to remove the retainer from the second component.

13. The airbag system of claim 10, wherein the one or more tethers are formed by being stretched between the securing base and the retainer.

14. The airbag system of claim 10, wherein the one or more tethers are folded with an arcuate bend in a non-deployed state, and wherein the one or more tethers straighten in response to the securing base separating from the retainer in response to the deployment of the airbag.

15. The airbag system of claim 10, wherein one of the securing base or the retainer comprises one or more protuberances, wherein the other of the securing base or the retainer comprises one or more windows configured to retain the one or more protuberances, wherein the securing base is secured to the retainer in a non-deployed state by the one or more windows retaining the one or more protuberances, and wherein the one or more protuberances separate from the one or more windows in response to the deployment of the airbag.

16. A tethering clip assembly configured to tether first and second components of a vehicle together before and during deployment of an airbag, the tethering clip assembly comprising:
 a securing base configured to secure to the first component;
 a retainer configured to secure to the second component, wherein the retainer comprises opposed end blocks, a base beam extending between portions of the opposed end blocks, and a plurality of first legs extending from the base beam, wherein at least one of the plurality of first legs comprises a notch configured to securely retain an edge portion of the second component, and a tab proximate to the notch, wherein the tab is configured to be engaged by a tool to remove the retainer from the second component; and
 one or more tethers that couple the securing base to the retainer, wherein the securing base, the retainer, and the one or more tethers are integrally formed together.

* * * * *